(12) United States Patent
Heitplatz

(10) Patent No.: US 8,757,347 B2
(45) Date of Patent: Jun. 24, 2014

(54) GRAVITY CHUTE

(75) Inventor: Heino Heitplatz, Drensteinfurt (DE)

(73) Assignee: Beumer GmbH & Co. KG, Beckum (DE)

( * ) Notice: Subject to any disclaimer, the term of this patent is extended or adjusted under 35 U.S.C. 154(b) by 0 days.

(21) Appl. No.: 13/823,697

(22) PCT Filed: Oct. 20, 2011

(86) PCT No.: PCT/DE2011/001874
§ 371 (c)(1),
(2), (4) Date: Jun. 18, 2013

(87) PCT Pub. No.: WO2012/052005
PCT Pub. Date: Apr. 26, 2012

(65) Prior Publication Data
US 2013/0256090 A1    Oct. 3, 2013

(30) Foreign Application Priority Data

Oct. 22, 2010  (DE) .......................... 10 2010 049 281

(51) Int. Cl.
*B65G 11/20* (2006.01)
(52) U.S. Cl.
USPC ............................... 193/32; 193/4; 193/25 A
(58) Field of Classification Search
USPC ................... 193/2 R, 3, 4, 25 A, 25 FT, 32
See application file for complete search history.

(56) References Cited

U.S. PATENT DOCUMENTS 1,515,965 A * 11/1924 Frank Pardee ................ 209/697
1,861,976 A *  6/1932 Frank Pardee ................. 193/12
3,064,783 A * 11/1962 McClelland, Jr. .............. 193/38
3,114,332 A   12/1963 Bacon et al.
3,880,276 A    4/1975 Willett, III
4,726,456 A    2/1988 Hogsett
4,729,466 A    3/1988 Bollier et al.
4,793,473 A   12/1988 Gilgore et al.

(Continued)

FOREIGN PATENT DOCUMENTS

DE    20205395     9/2002
EP   0700 844 A3   5/1996

(Continued)

OTHER PUBLICATIONS

Office Action dated Apr. 12, 2013, in U.S. Appl. No. 13/003,289; 8 pages.

(Continued)

*Primary Examiner* — Leslie A Nicholson, III
*Assistant Examiner* — Keith R Campbell
(74) *Attorney, Agent, or Firm* — Ganz Law, P.C.

(57) ABSTRACT

A gravity chute for articles, comprising a chute floor defining a conveying surface, wherein the conveying surface has a conveying angle of inclination pointing in a conveying direction, and comprising at least one side wall which laterally delimits the chute floor, wherein, in addition to the conveying angle of inclination, the conveying surface has a transverse angle of inclination directed transversely to the conveying direction and pointing to a side wall, wherein the side wall, to which the conveying surface runs at a transverse inclination, has first friction properties within a first region extending from the conveying surface to a height h, and has second friction properties within a second region extending above the height h, which differ from the first friction properties, the side wall being recessed within the first region with respect to the second region.

18 Claims, 3 Drawing Sheets

(56) References Cited

U.S. PATENT DOCUMENTS

Figure 1:
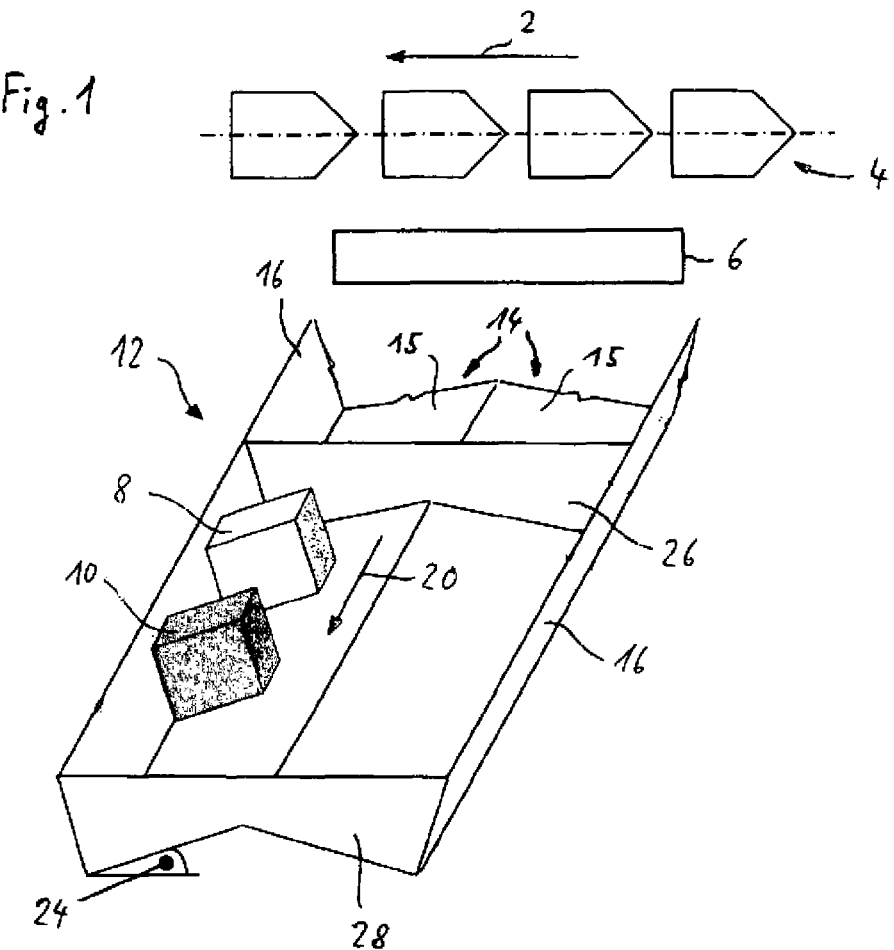

| | | |
|---|---|---|
| 4,951,801 A | 8/1990 | Mraz |
| 5,190,134 A | 3/1993 | Mraz |
| 5,220,986 A * | 6/1993 | Winkler, III ............... 193/25 A |
| 5,611,418 A | 3/1997 | Helmstetter |
| 5,901,830 A | 5/1999 | Kalm et al. |
| 6,050,390 A * | 4/2000 | Fortenbery et al. ...... 198/370.03 |
| 6,082,522 A | 7/2000 | Polling |
| 6,216,842 B1 * | 4/2001 | Beale et al. ...................... 193/20 |
| 6,736,254 B1 | 5/2004 | Fortenbery et al. |
| 7,166,814 B2 | 1/2007 | Nakanishi et al. |
| 2004/0016679 A1 | 1/2004 | Schieleit |
| 2004/0216985 A1 | 11/2004 | Nishihara et al. |
| 2010/0314223 A1 | 12/2010 | Franz |
| 2011/0108392 A1 | 5/2011 | Polling |
| 2012/0012438 A1 | 1/2012 | Heitplatz |

FOREIGN PATENT DOCUMENTS

| | | |
|---|---|---|
| EP | 1338346 A2 | 8/2003 |
| EP | 1352858 A2 | 10/2003 |
| SU | 1489855 A1 | 6/1989 |
| WO | 9009944 | 9/1990 |
| WO | 9103324 | 3/1991 |
| WO | 9831617 | 7/1998 |
| WO | 9855379 A1 | 12/1998 |

OTHER PUBLICATIONS

PCT Search Report and Written Opinion dated Jun. 15, 2010, in International Patent Application No. PCT/DE2009/01785, accompanied by English-Language Translation; 19 pages.

PCT Search Report and Written Opinion dated Nov. 5, 2009, in International Patent Application No. PCT/DE2009/000737; accompanied by English-Language Translation; 15 pages.

PCT Search Report and Written Opinion dated Mar. 21, 2012, in International Patent Application No. PCT/DE2011/001874; accompanied by English-Language Translation; 21 pages.

German Examination Report dated Oct. 8, 2009, for German Patent Application 10 2009 009 044.4-22, 4 pages.

Office Action dated Feb. 6, 2013, for U.S. Appl. No. 13/201,608, 23 pages.

\* cited by examiner

Schnitt A-A

GRAVITY CHUTE

The invention relates to a gravity chute for articles, especially at a delivery end of a sorting conveyor, comprising a chute floor that defines a conveying surface, wherein the conveying surface has a conveying angle of inclination pointing in a conveying direction, and comprising at least one side wall which laterally delimits the chute floor. Gravity chutes of this kind are used especially in sorting facilities for sorting parcelled goods as terminals for receiving and storing the sorted parcelled goods and consist substantially of a flat chute floor arranged at a conveying angle of inclination relative to the horizontal, and especially transversely to the longitudinal axis of the sorting conveyor, and of two side walls arranged laterally and perpendicularly to the chute floor. If the terminal is also used for storing the parcelled goods, the inclination of the chute floor or the conveying surface must be made sufficiently large for the parcelled goods to begin to move from rest against the static friction when necessary. This is especially important when the chute floor is interrupted by separating flaps.

In practice, it is frequently required that articles of different natures and especially with different surface properties and friction characteristics should be conveyed in the same terminal. This is the case, for example, whenever cardboard boxes, such as shoe cartons, and articles packed in plastic bags, such as textiles, are to be sorted in a common terminal. The angle of inclination of the chute must then be selected such that the article to be conveyed with the greatest coefficient of friction, which results from the friction pairing between the surface of the article to be conveyed and the surface of the chute—the plastic bag in the example mentioned above—, reliably begins to move from rest. The consequence of this is that the angle of inclination for articles of this kind, for which a low coefficient of friction results (such as cardboard boxes), is too large, which causes those articles to accelerate too rapidly when sliding down, so that when they strike an end stop, separating flaps or other articles, they have a high impact speed and hence possess a high impact energy, which can cause undesirable damage to the articles to be sorted.

So far, this problem has been solved by active elements, such as brake straps (belt conveyors), variable inclinations, brake flaps or active braking strips in the chute floor, though these entail considerable additional costs.

The problem of the invention consists in improving a gravity chute of the generic kind in such a way that it can be ensured that parcelled goods with different surface properties and hence different coefficients of friction in the case of friction pairing with the chute are conveyed in a gentle and inexpensive manner.

This problem is solved by a gravity chute according to, for example, a gravity chute for articles, comprising a chute floor (14) defining a conveying surface (15), wherein the conveying surface (15) has a conveying angle of inclination (22) pointing in a conveying direction (20), and comprising at least one side wall (16) which laterally delimits the chute floor (14), wherein, in addition to the conveying angle of inclination (22), the conveying surface (15) has a transverse angle of inclination (24) directed transversely to the conveying direction (20) and pointing to a side wall (16), characterised in that the side wall (16), to which the conveying surface (15) runs at a transverse inclination, has first friction properties within a first region (17) extending from the conveying surface (15) to a height (h), and has second friction properties within a second region (18) extending above the height (h), which differ from the first friction properties, the side wall (16) being recessed within the first region (17) with respect to the second region (18). The conveying surface is the surface of the chute floor or its effective part, which comes into contact with a article conveyed and governs the behaviour of the article with its friction properties. In the case of a flat chute floor, the conveying surface can be the flat surface of the chute floor. Alternatively, in the case of a chute floor which is profiled in cross-section, the conveying surface can be formed by a surface of profiling, elevations, ribs or strips running in the conveying direction of the chute floor, on which the articles to be conveyed rest.

It may be contemplated that the side wall, at a transverse angle to which the conveying surface runs, possesses friction properties which differ from the friction properties of the conveying surface and, especially in friction pairing with articles to be conveyed, form a coefficient of sliding friction which differs from a coefficient of sliding friction formed in friction pairing with the chute floor and in particular is greater than the latter, at least when the article concerned possesses uniform friction properties on its surfaces on which it touches the lateral surface and the chute floor.

In one variant, it may be contemplated that the side wall, at a transverse angle to which the conveying surface runs, possesses first friction properties within a first region extending from the conveying surface to a first height, and second friction properties within a second region extending above the first height, which differ from the first friction properties. Different friction properties between the two regions mean that with an article that is in frictional contact with the first region and forms a friction pairing, a different coefficient of adhesion and coefficient of sliding friction occurs than in the second region. By adapting the first height to different articles conveyed with the gravity chute, different friction forces and hence different braking effects on different articles or categories of articles can be generated, especially when they differ in height.

In a first variant, the first region may recede gradually or more or less continuously with respect to the second region, especially in the form of an arrangement which is not perpendicular to the conveying surface, but is inclined at an angle of less than 90°. In special cases, the side wall may be inclined in the first region at a first angle of less than 90° relative to the conveying surface sein, and may be inclined in the second region at a second angle, likewise less than 90°, relative to the conveying surface, wherein the first angle may be smaller or larger than the second angle.

Alternatively, the side wall may be curved convexly or concavely in cross-section relative to the conveying surface, as a result of which, as the height of the side wall above the conveying surface declines, a faster (progressive) or slower (degressive) recession of the first region occurs.

In a second variant, it may be contemplated that the side wall is designed to be recessed in steps within the first region as a whole with respect to the second region, especially by a step height of at least 1 mm, 2 mm, 3 mm, 5 mm, 8 mm, 10 mm, 15 mm, 20 mm, 30 mm, 50 mm or 100 mm.

It goes without saying that all the variants can be combined, with the side wall running perpendicularly to the conveying surface in the first or second region, for example, or at an angle of less than 90° thereto, and in the other region at an angle of less than 90° to the conveying surface, while in addition the first region as a whole can be designed to be recessed in steps with respect to the second region, wherein the first and/or the second regions may in addition be curved convexly or concavely in cross-section.

The transverse inclination of the conveying surface may be between 5° and 45°, especially between 10° and 30°.

The conveying surface may possess friction properties which, in friction pairing with articles to be conveyed, generate a coefficient of sliding friction in the region of 0.05 to 1, especially 0.1 to 0.6, where the conveying surface may consist of metal with or without a coating, stainless steel, plastic, wood, roller strips or a roller track.

It may be contemplated that within the first region, the side wall consists at least on its surface of metal, plastic, a roller strip or belt material, especially of wood.

In addition, it may be contemplated that within the second region, the side wall consists at least on its surface of metal, plastic, belt material such as PU or PVC, or a roller strip especially of wood.

It is conveniently contemplated that the side wall and/or the chute floor are flat and can be arranged perpendicularly to one another.

It is possible to design the gravity chute as a double or multiple chute with two or more chute floors and side walls arranged side by side.

The invention further relates to a sorting conveyor with a delivery station on which a gravity chute in accordance with the invention is arranged.

Figure 2:
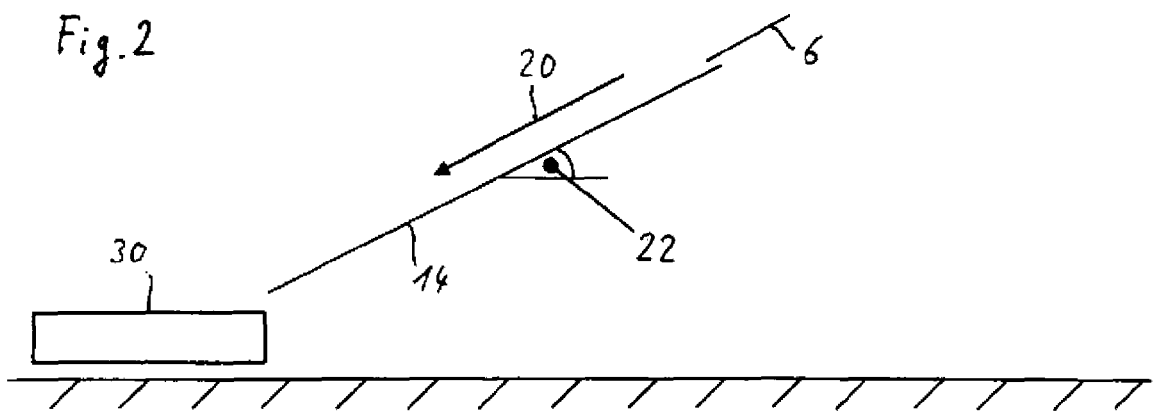
Figure 3:
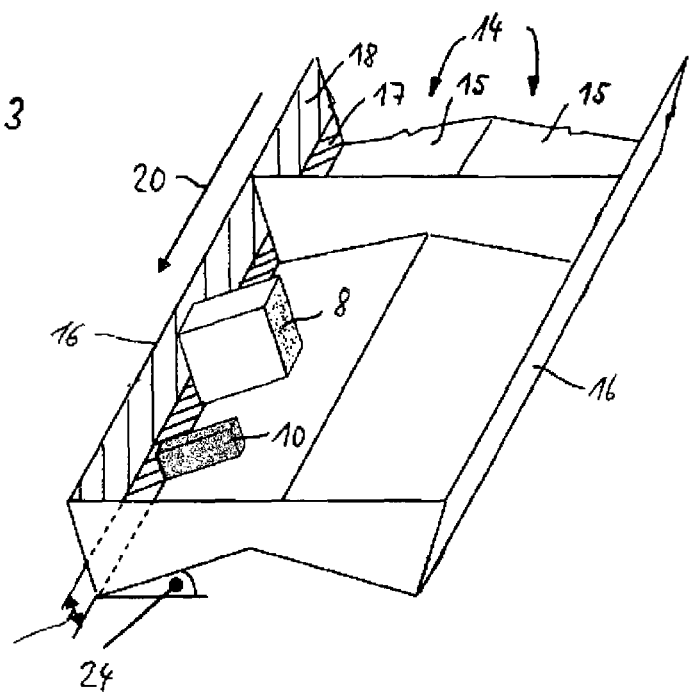
Figure 4A:
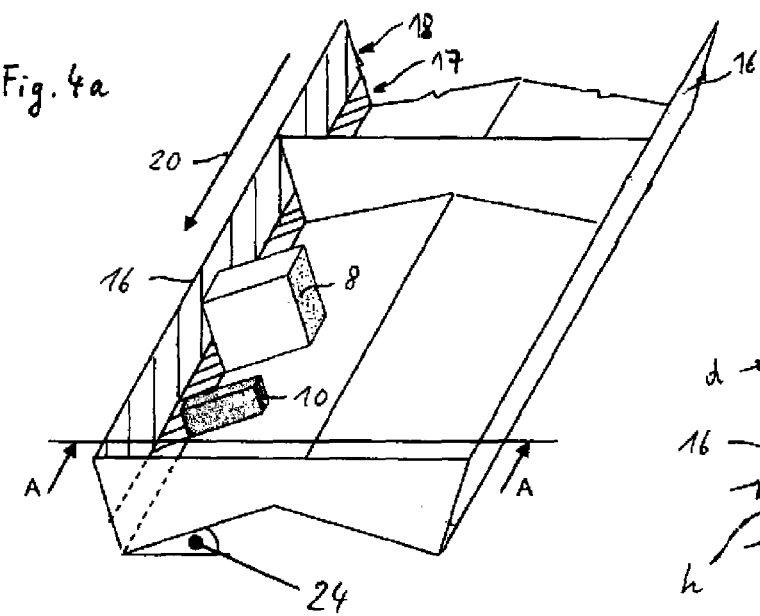
Figure 4B:
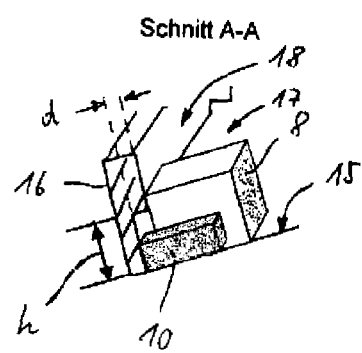
Figure 4C:
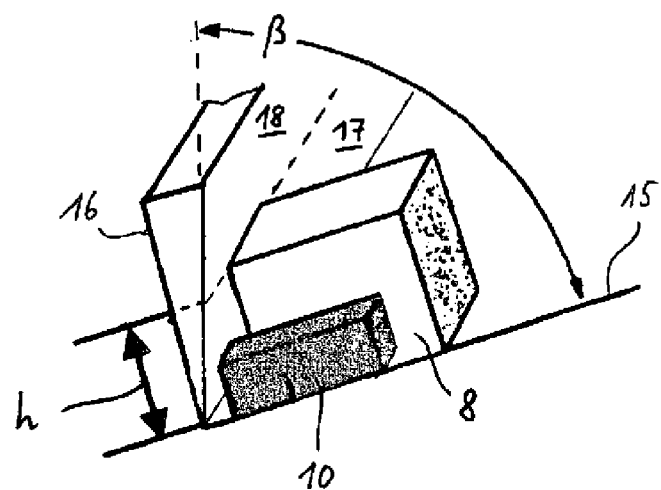

The invention will now be further illustrated with reference to a drawing, in which FIG. 1 shows a first embodiment of the invention in a schematic perspective view, FIG. 2 illustrates the conveying angle of inclination of the gravity chute, which is arranged obliquely or transversely to the conveying direction of a sorting conveyor, FIG. 3 shows a second embodiment of the invention, FIGS. 4a, b show a third embodiment of the invention, and FIG. 4c shows another embodiment having an alternative arrangement compared to that shown in FIG. 4b, and FIGS. 5 to 7 illustrate further variants of the invention.

As FIG. 1 shows, the basic idea of the invention is not like a conventional gravity chute, where the chute floor is inclined in the conveying direction, but transversely thereto is aligned horizontally, or not inclined, and whose side walls are perpendicular, but consists in providing the chute floor with a transverse inclination in addition to its conveying inclination. FIG. 1 schematically shows a sorting conveyor 4 moved in a sorting conveying direction 2, which transfers conveyed articles 8, 10 to a gravity chute 12 at a delivery station 6. The gravity chute 12 is shaped double, like a roof, and has two chute floors 14 arranged in a mirror image of one another and side walls 16 arranged perpendicularly thereto at their outer longitudinal edges. Each chute floor 14 defines a conveying surface 15, which has a conveying angle of inclination 22 pointing in the conveying direction 20 and a transverse angle of inclination 24 pointing transversely to the conveying direction 20 (relative to a horizontal plane in each case).

One or more flaps 26 may be arranged in the course of the gravity chute in order temporarily to retain articles taken over from the sorting conveyor 4 and to release them in a controlled way. At a lower end of the gravity chute, a stop 28 may be provided which releases the articles in a controlled manner into a delivery area 30.

For the side walls, it is preferable to choose a material with different friction properties relative to the conveying surface, so that the friction properties of the side wall and the conveying surface differ from one another.

In particular, it can be beneficial to choose materials with which a higher coefficient of sliding friction results between the side wall and the articles to be conveyed than between the chute floor and the articles. This means that with articles with a comparatively high coefficient of sliding friction to the conveying surface, a comparatively low perpendicular force to the side wall develops, so that despite the higher coefficient of sliding friction at the side wall, the articles are retarded comparatively less strongly. On the other hand, articles with a comparatively low coefficient of sliding friction to the conveying surface experience a comparatively high perpendicular force towards the side wall, so that the high coefficient of sliding friction between the article and the side wall has a comparatively stronger retarding effect.

FIG. 3 shows an embodiment which is suitable for cases in which the conveyed articles are of different heights (either smaller or larger than a dimension h) above the conveying surface and there is a typical connection between the height of an article and the friction properties of the article. One example is low articles in the form of plastic bags, e.g. made from polyethylene, which are generally flat and tend to possess higher coefficients of friction, in contrast to cardboard boxes, which generally have a greater height and tend to possess smaller coefficients of friction. The differences in size can be exploited if the side wall has different friction properties at different heights, such as metal, plastic, a belt or a roller strip.

In FIG. 3, within a first region 17, which extends to a height h, measured perpendicularly above the conveying surface 15, the side wall 16 may have first friction properties and consist on its surface of a material which, in friction pairing with most packaging materials (e.g. plastic sheeting, cardboard), leads, for example, to a relatively small coefficient of sliding friction. In a second region 18, which extends above the height h, the side wall 16 may consist on its surface of a material that has second friction properties which, in friction pairing with most packaging materials, lead to a relatively high coefficient of sliding friction. As a result, articles 8 in which, in friction pairing with a conventional gravity chute, there is a relatively small coefficient of sliding friction—in this example, cardboard boxes with a height greater than the height h—come partially or mainly into contact with a surface whose friction properties lead to a relatively high coefficient of sliding friction, so that those articles are braked more strongly than in the state of the art.

Conversely, in the application according to FIG. 3, articles 10 whose height is smaller than the height h and whose material, in friction pairing with a conventional gravity chute leads to a relatively large coefficient of sliding friction come into contact with a surface with the first friction properties, which, in friction pairing with the article, leads to a relatively small coefficient of sliding friction (smaller than in the case of the articles mentioned previously with a height>h), so that these parcelled goods, which are braked relatively strongly in the state of the art, are braked less strongly in accordance with the invention.

With an appropriate choice of the surface qualities or friction properties of the two regions of the side wall, it can be ensured that articles reach a similar sliding or conveying speed despite their different packaging materials.

The embodiment according to FIG. 3 is appropriate whenever flat articles with high coefficients of sliding friction and high articles with low coefficients of sliding friction correlate, based in each case on friction pairing with the conveying surface. If the relationships are reversed, the friction properties of the side walls also have to be arranged in reverse, as FIG. 4 shows. In a first region 17 up to a first height h, the side wall, proceeding from the conveying surface, has a surface with friction properties which, in friction pairing with articles 10 whose height is smaller than the height h, leads to a first coefficient of sliding friction, which is smaller than a second coefficient of sliding friction, which results from a friction pairing of articles 8 whose height is greater than the height h and which are in contact with a second region 18 of the side wall, which extends above the height h and possesses second friction properties, which differ from the first friction properties and lead to the desired higher coefficient of sliding friction.

Since the first region 17 of the side wall, which extends up to the height h, is arranged to be recessed with respect to the second region 18, articles with a height greater than the height h come into frictional contact exclusively with material with second friction properties, whereas, conversely, flat articles with a height smaller than the height h come into frictional contact exclusively with material with first friction properties, as is illustrated in the section view according to FIG. 4b.

An alternative to the arrangement recessed in steps is shown in FIG. 4c, where an angle of inclination β of the side wall 16 is less than 90° with respect to the conveying surface 15, causing the first region 17 to be recessed gradually with respect to the second region 18.

Figure 5:
Figure 6:
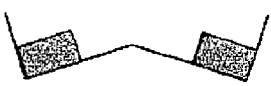
Figure 7:

FIGS. 5 to 7 schematically illustrate different possible ways of arranging a gravity chute in accordance with the invention, FIG. 5 showing a single embodiment, FIG. 6 showing a double embodiment in the shape of a roof, corresponding to FIGS. 2 to 4, and FIG. 7 showing a multiple arrangement side by side, where the individual chute floors and side walls are parallel to one another in each case.

List of Reference Numerals
2 Sorting conveying direction
4 Sorting conveyor
6 Delivery station
8, 10 Article
12 Gravity chute
14 Chute floor
15 Conveying surface
16 Side wall
17 First region
18 Second region
20 Conveying direction
22 Conveying angle of inclination
24 Transverse angle of inclination
26 Flap
28 Stop
30 Delivery area
h Height
β Angle of inclination (between 16 and 15).

The invention claimed is:

1. A gravity chute for articles, comprising a chute floor defining a conveying surface, wherein the conveying surface has a conveying angle of inclination pointing in a conveying direction, and comprising at least one side wall which laterally delimits the chute floor, wherein, in addition to the conveying angle of inclination, the conveying surface has a transverse angle of inclination directed transversely to the conveying direction and pointing to a side wall, characterised in that the side wall, to which the conveying surface runs at a transverse inclination, has first friction properties within a first region extending from the conveying surface to a height, and has second friction properties within a second region extending above the height, which differ from the first friction properties, the side wall being recessed within the first region with respect to the second region.

2. A gravity chute as claimed in claim 1, characterised in that the side wall encloses an angle with the conveying surface of less than 90°.

3. A gravity chute as claimed in claim 1, characterised in that the side wall is designed to be recessed within the first region as a whole with respect to the second region.

4. A gravity chute as claimed in claim 1, characterised in that the transverse angle of inclination of the conveying surface is between 5° and 45°.

5. A gravity chute as claimed in claim 1, characterised in that the conveying surface possesses friction properties which, in friction pairing with articles to be conveyed, generate a coefficient of sliding friction between about 0.05 and about 1.

6. A gravity chute as claimed in claim 1, characterised in that the conveying surface consists of metal, with or without a coating, stainless steel, plastic, wood, roller strips or a roller track.

7. A gravity chute as claimed in claim 1, characterised in that within the first region, a surface of the side wall comprises one or more of a metal, a plastic, a belt material, a roller strip, and a wood.

8. A gravity chute as claimed in claim 1, characterised in that within the second region, a surface of the side wall comprises one or more a of a metal, a plastic, a belt material, a roller strip, and a wood.

9. A gravity chute as claimed in claim 1, characterised in that the side wall and/or the conveying surface are flat and are arrangeable perpendicularly to one another.

10. A gravity chute as claimed in claim 1, characterised in that it is designed as a multiple chute with a plurality of chute floors and side walls arranged side by side.

11. A sorting conveyor, comprising:
a delivery station; and
a gravity chute for articles arranged on the delivery station, the gravity chute comprising a chute floor defining a conveying surface, wherein the conveying surface has a conveying angle of inclination pointing in a conveying direction, and comprising at least one side wall which laterally delimits the chute floor, wherein, in addition to the conveying angle of inclination, the conveying surface has a transverse angle of inclination directed transversely to the conveying direction and pointing to a side wall, characterised in that the side wall, to which the conveying surface runs at a transverse inclination, has first friction properties within a first region extending from the conveying surface to a height, and has second friction properties within a second region extending above the height, which differ from the first friction properties, the side wall being recessed within the first region with respect to the second region.

12. A gravity chute as claimed in claim 2, wherein the side wall encloses an angle with the conveying surface of between about 45° and about 85°.

13. A gravity chute as claimed in claim 2, wherein the side wall encloses an angle with the conveying surface of less than about 45°.

14. A gravity chute as claimed in claim 1, wherein the side wall is designed to be recessed within the first region as a whole with respect to the second region by a step height (d) of at least 1 mm.

15. A gravity chute as claimed in claim 1, wherein the step height (d) is between about 1 mm and about 50 mm.

16. A gravity chute as claimed in claim 14, wherein the step height (d) is at least 50 mm.

17. A gravity chute as claimed in claim 4, wherein the transverse angle of inclination of the conveying surface is between about 10° and about 30°.

18. A gravity chute as claimed in claim 5, wherein the conveying surface possesses friction properties which, in friction pairing with articles to be conveyed, generate a coefficient of sliding friction between about 0.1 and about 0.6.

* * * * *